Patented Feb. 9, 1943

2,310,383

UNITED STATES PATENT OFFICE 2,310,383

MINERAL FORTIFICATION OF FOODSTUFFS AND MEDICINAL PRODUCTS

John S. Andrews, St. Paul, and Lacey H. Evans and Louis J. Huber, Minneapolis, Minn., assignors to General Mills, Inc., a corporation of Delaware No Drawing. Application April 16, 1941, Serial No. 388,816

15 Claims. (Cl. 99—163)

This invention relates to the mineral fortification of foodstuffs and medicinal products with salts of phytic acid and more particularly to the fortification with the copper, manganese and iron salts of this acid.

This application is a continuation in part of our application Serial No. 298,692, filed on October 9, 1939, for mineral fortification of foodstuffs.

The principal object of our invention is to increase the copper, iron, and/or manganense content of foodstuffs and medicinal products by the addition thereto of colorless non-ionizing compounds of phytic acid, said compounds being insoluble in water and in dilute solutions of weak acids.

Another object of our invention is to fortify foodstuffs and medicinal products with non-ionizing salts of phytic acid, such as copper, iron and manganese phytates.

A further object of our invention is the provision of a method of inclusion in foodstuffs and medicinal products of non-ionized iron, manganese and copper compounds of phytic acid, which because of their non-ionization, under normal conditions, do not accelerate the development of rancidity in such foodstuffs and medicinal products.

A still further object of our invention is to provide assimilable mineral-fortified foodstuffs and medicinal products containing non-ionizing salts of phytic acid which are capable of preventing or correcting mineral deficiencies in animals and humans when included in the diet of such animals and humans.

Many food products are low in mineral constituents and it would be advantageous to raise the nutritional value of these products by the incorporation of iron, copper and/or manganese salts in amounts which would make the product a rich source of these necessary minerals.

In the manufacture of pharmaceutical preparations, it is often desirable to include a source of available iron, copper and/or manganese in these products to enhance the curative or protective scope of these preparations.

In the case of vitamin tablets containing the oil-soluble vitamins, the inclusion of the ordinary compounds of iron, copper, and manganese, such as the chlorides or sulfates, would impair the stability of the fatty constituents and lead to the development of rancidity.

Our invention is based on the discovery that the above disadvantages may be obviated by incorporating a suitable amount of phytic acid salt of the mineral desired. These salts may be incorporated in the food or pharmaceutical product in any suitable or desired manner. For example, when it is desired to fortify malted milk with iron, the iron phytate is added to the malted mixture prior to drying in a finely divided form in an amount to give an iron phytate content of the final dried product of 0.01% to 1%, by weight.

In practicing our invention, we take a suitable salt of phytic acid, such as iron, copper and/or manganese phytates, which may be prepared as disclosed in our copending application Serial No. 298,692, and mix or blend the salt with a suitable foodstuff or pharmaceutical preparation ordinarily in the following relative proportions: .002% to 1%, by weight, of the salt, or .002 lb. to 1 lb. per 100 pounds of the foodstuff or pharmaceutical preparation.

We have found that we may fortify the following foodstuffs and/or pharmaceutical preparations, with one or more of the above-mentioned phytate salts:

(1) Dairy products such as condensed milk, powdered milk, malted milk, chocolate milk, and cheese such as cream, cottage, or brick cheeses, and ice cream. For example, condensed milk is notably deficient in iron as it normally contains approximately 0.2 milligram of iron per 100 grams. Since the normal daily requirement for an infant is about 15 milligrams of iron per day it would be desirable to increase the iron content of the product so that a normal serving would furnish a suitable aliquot of the daily requirement. Iron phytate in finely divided form may be added in the amount of 0.002% to 1%, by weight, to the raw milk prior to the concentration thereof. Since the viscosity of the milk is greatly increased by the condensing operation there will be no danger of a settling out of the iron phytate.

When it is desired to incorporate one of the above-mentioned phytate salts in the quantities indicated above in cream cheese, the phytate salt is added to the curd from which the cheese is made at the same time that emulsifying agents are added thereto, and the curd is then treated in the usual manner for the production of cream cheese.

(2) Leavening agents such as baking powder and yeast. For example, when it is desired to fortify baking powder with iron phytate, from 1% to 10%, by weight, of finely divided iron phytate may be blended or mixed with the ingredients of the baking powder. Since the phytate is inert and does not enter into the production of carbon dioxide gas evolved during the leavening process, the same relative proportions of acid and basic ingredients are maintained in the composition of the baking powder. The added phytate may be substituted for a portion of the starch filler normally present in baking powder. The fortification of baking powder with iron phytate affords a convenient method for the fortification of baked products with a stable form of iron.

Yeast may not only be used as a leavening agent and as a source of the B group of vitamins but it may also be consumed directly as a food for its medicinal value. For example, iron phytate in finely divided form, in the amount of 1% to 10%, by weight, may be added to a yeast suspension and mixed therewith prior to the dewatering of the suspension for the formation of a solid cake of yeast. When iron phytate is added to yeast in the above-described manner, it enhances the nutritional value of the yeast without producing any objectionable color.

(3) Beverage powders such as those consisting of a powdered mixture of cocoa, powdered milk, and sugar. One of the phytate salts, enumerated above, may be added to a powdered beverage in the amounts of .002% to 1.0%, by weight, and mixed therewith in any suitable manner.

(4) Dessert powders such as those consisting of corn starch, sugar, and a suitable flavoring or those consisting of rennet together with suitable coloring and flavoring materials or those consisting of gelatin with suitable coloring and flavoring materials. A suitable phytate salt may be added to these powdered desserts in the same manner and in the same proportions, as stated above for the fortification of powdered beverages.

One or more of the above-mentioned phytate salts, in the proportions indicated above (.002% to 1%, by weight) may be added by suitable means to other foods such as bread spreads, for example, peanut butter, jams and jellies; salad dressings such as mayonnaise or French dressing; shortenings of the animal and vegetable types; confectionery such as fudge mixes, chocolate, and fondant; meat sauces such as soya sauces, tomato catsup, and anchovy sauce; and soups, either in liquid form or in the form of dry soup mixes in which the phytate salt is mixed with the spices of the dry soup mix.

As indicated above, it is desirable in many instances to add one or more of the above-mentioned phytate salts, preferably in finely divided condition, in amounts ranging from approximately 1% to 10%, by weight, to medicinal preparations such as vitamin tablets containing oil-soluble vitamins; malt-dextrin tonics; mineral supplement tablets or capsules such as those containing calcium and phosphorous; and desiccated glandular preparations.

The advantages of using the iron, copper and manganese phytates for the mineral enrichment of medicinal products are: their non-ionizing character prevents their interaction with such constituents of the products as the tannins present in tonics made from herbs or roots, which normally would form ink-like discolorations with ordinary iron salts; also the colorless properties of these phytate salts in no way interfere with the original appearance of the product.

It will, of course, be understood that the above-mentioned phytate salts are tasteless and odorless and relatively non-hygroscopic and stable on storage. Therefore, one or more of these salts may be mixed or incorporated with a foodstuff or a medicinal composition during the preparation thereof and the treated foodstuff or preparation will retain its original composition unimpaired.

The foregoing detailed description has been given for clearness of understanding only and no unnecessary limitations should be understood therefrom.

We claim as our invention:

1. A composition of matter comprising a material selected from the group consisting of foods and medicines which are adversely affected by the presence of an ionizable compound of a metal selected from the group consisting of copper, manganese and iron; admixed with a non-ionized phytate of a metal of said group.

2. A composition of matter comprising a milk product containing fat admixed with a non-ionized salt of phytic acid selected from the group consisting of copper, manganese and iron phytates.

3. A composition of matter comprising an edible oleaginous material admixed with a non-ionized salt of phytic acid selected from the group consisting of copper, manganese and iron phytates.

4. A composition of matter comprising a pharmaceutical product which is adversely affected by the presence of an ionizable compound of a metal selected from the group consisting of copper, manganese and iron; admixed with a non-ionized phytate of a metal of said group.

5. A composition of matter comprising dried milk admixed with a non-ionized salt of phytic acid selected from the group consisting of copper, manganese and iron phytates.

6. A composition of matter comprising a shortening admixed with a non-ionized salt of phytic acid selected from the group consisting of copper, manganese and iron phytates.

7. A composition of matter comprising yeast admixed with a non-ionized salt of phytic acid selected from the group consisting of copper, manganese and iron phytates.

8. A composition of matter comprising a material selected from the group consisting of foods and medicines which is adversely affected by the presence of an ionizable iron compound admixed with iron phytate.

9. A composition of matter comprising a milk product containing fat admixed with iron phytate.

10. A composition of matter comprising dried milk admixed with iron phytate.

11. A composition of matter comprising an oleaginous material admixed with iron phytate.

12. A composition of matter comprising a shortening admixed with iron phytate.

13. A composition of matter comprising a pharmaceutical product which is adversely affected by the presence of an ionizable iron compound, admixed with iron phytate.

14. A composition of matter comprising yeast admixed with iron phytate.

15. A composition of matter comprising a food product which is adversely affected by the presence of an ionizable compound of a metal selected from the group consisting of copper, manganese and iron, admixed with a non-ionized phytate of a metal of said group.

JOHN S. ANDREWS.
LACEY H. EVANS.
LOUIS J. HUBER.